(12) United States Patent
Grandjean

(10) Patent No.: US 10,826,103 B2
(45) Date of Patent: Nov. 3, 2020

(54) FUEL CELL

(71) Applicant: COMPAGNIE GENERALE DES ETABLISSEMENTS MICHELIN, Clermont-Ferrand (FR)

(72) Inventor: Arnaud Grandjean, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 202 days.

(21) Appl. No.: 15/575,224

(22) PCT Filed: May 17, 2016

(86) PCT No.: PCT/EP2016/060957
§ 371 (c)(1),
(2) Date: Nov. 17, 2017

(87) PCT Pub. No.: WO2016/188787
PCT Pub. Date: Dec. 1, 2016

(65) Prior Publication Data
US 2018/0151906 A1 May 31, 2018

(30) Foreign Application Priority Data
May 22, 2015 (FR) .................................... 15 54609

(51) Int. Cl.
*H01M 8/248* (2016.01)
(52) U.S. Cl.
CPC ........ *H01M 8/248* (2013.01); *H01M 2250/20* (2013.01); *Y02T 90/40* (2013.01)

(58) Field of Classification Search
CPC .... H01M 8/248; H01M 2250/20; Y02T 90/32
See application file for complete search history.

(56) References Cited

U.S. PATENT DOCUMENTS

| 4,345,009 A * | 8/1982 | Fahle ................. H01M 8/2485 429/460 |
| 5,993,987 A | 11/1999 | Wozniczka et al. ........... 429/37 |

(Continued)

FOREIGN PATENT DOCUMENTS

| JP | 2001-126750 A | 5/2001 |
| JP | 2005-142049 A | 6/2005 |

(Continued)

OTHER PUBLICATIONS

Machine translation of JP 2007-329017 A (Year: 2007).*

(Continued)

*Primary Examiner* — Milton I Cano
*Assistant Examiner* — Philip A. Stuckey
(74) *Attorney, Agent, or Firm* — Venable LLP

(57) ABSTRACT

A fuel cell includes (1) a stack including (a) an assembly of overlaid electrochemical generators, which are disposed along a stack axis, and (b) end plates axially clasping the assembly, and (2) at least one holding winding. Each holding winding includes at least one taut wire wound around the stack in a plurality of turns. Each holding winding surrounds the stack and bears on the end plates. Each taut wire is formed of at least one layer or sheet, and ends of each taut wire are fixed on at least one of the end plates.

15 Claims, 5 Drawing Sheets

(56) References Cited

U.S. PATENT DOCUMENTS

| | | |
|---|---|---|
| 7,858,224 B2 | 12/2010 | Kim et al. |
| 8,054,041 B2 | 11/2011 | Kim et al. |
| 2005/0042493 A1 | 2/2005 | Fujita et al. .................. 429/34 |
| 2006/0093890 A1 | 5/2006 | Steinbroner .................. 429/37 |
| 2007/0052390 A1 | 3/2007 | Kim et al. |
| 2009/0029232 A1* | 1/2009 | Petty .................. H01M 8/2485 |
| | | 429/460 |
| 2011/0064992 A1 | 3/2011 | Kim et al. |
| 2011/0086292 A1* | 4/2011 | Ko ...................... H01M 8/248 |
| | | 429/507 |
| 2013/0273452 A1* | 10/2013 | Barton ............... H01M 8/2465 |
| | | 429/469 |
| 2014/0356753 A1 | 12/2014 | Guenthart et al. ........... 429/469 |

FOREIGN PATENT DOCUMENTS

| | | | |
|---|---|---|---|
| JP | 2007-073509 A | | 3/2007 |
| JP | 2007-329017 A | | 12/2007 |
| JP | 2007329017 A | * | 12/2007 |
| KR | 2008-0086614 A | | 9/2008 |
| WO | WO 2015/056084 A1 | | 4/2015 |

OTHER PUBLICATIONS

Jul. 18, 2016 International Search Report and Written Opinion in International Patent Appln. No. PCT/EP2016/060957.
Dec. 23, 2019 Japanese Official Action in Japanese Patent Appln. No. 2017-560769.

* cited by examiner

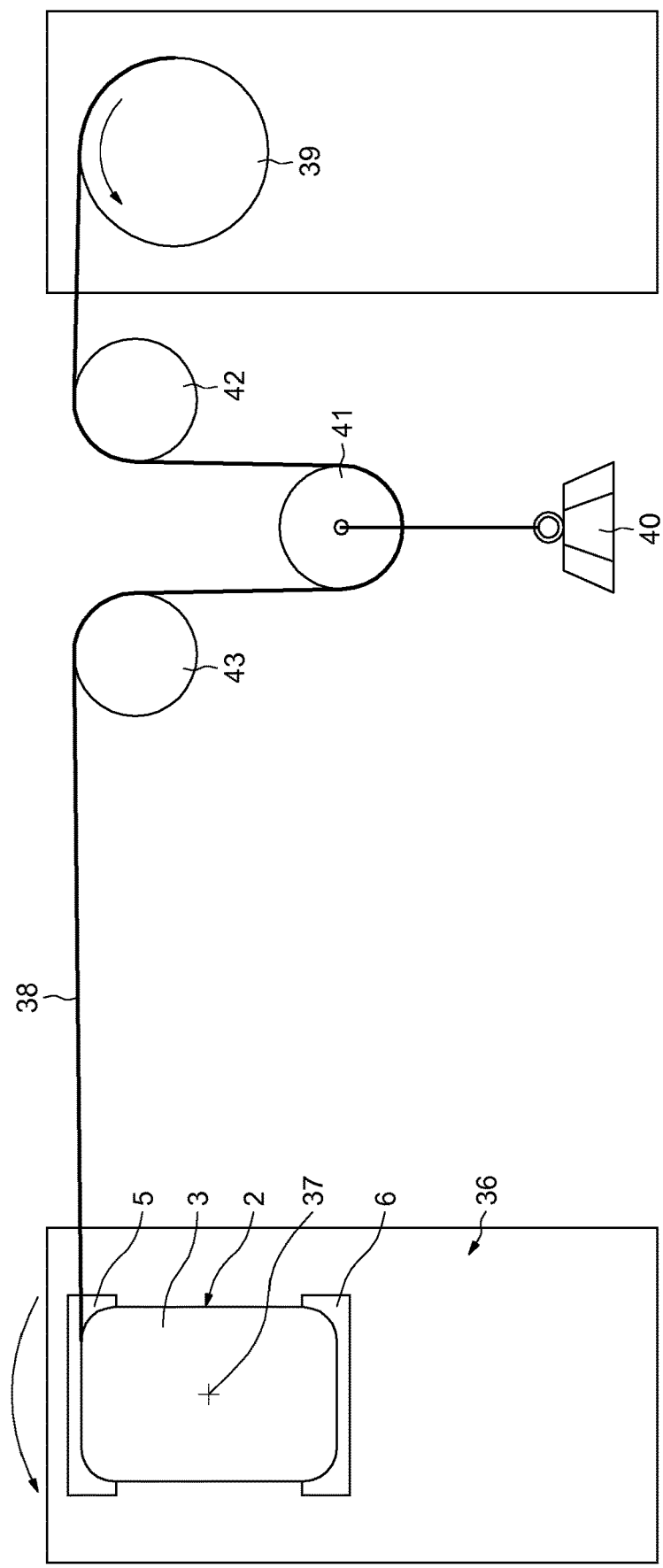

FUEL CELL

FIELD OF THE INVENTION

The present invention relates to the field of fuel cells, in particular the field of fuel cells suitable for use in motor vehicles.

RELATED ART

A fuel cell enables the generation of electrical energy via an electrochemical reaction from a fuel, generally hydrogen, and from an oxidizer, generally oxygen.

A solid electrolyte proton exchange membrane fuel cell (PEMFC) usually comprises a stack of unit cells, in the form of plates, forming electrochemical generators, each of the unit cells being separated from the adjacent unit cells by bipolar plates. Each unit cell comprises an anode element and a cathode element, separated by a solid electrolyte in the form of an ion exchange membrane, made, for example, of a sulfured perfluorinated polymer material. According to a usual alternative embodiment, each bipolar plate supplies, on one side, fuel to the unit cell adjacent to this side and supplies, on the other side, oxidizer to the unit cell adjacent to this other side, the supplying operations by the bipolar plates occurring in parallel.

The successive stack of the bipolar plates and of the unit cells is held under bearing pressures that must ensure a good electrical contact and a desired airtightness. Usually, the stack comprises end rigid plates connected by tie rods, with insertion of spring elements to limit the effects of the temperature and humidity variations on the bearing pressures. Such a solution is not, however, completely satisfactory.

The patents WO2015/056084, US2005/0042493, U.S. Pat. No. 5,993,987, US2006/0093890 and US2014/0356753 describe plate stacks surrounded by portions of taut straps.

BRIEF DESCRIPTION OF EMBODIMENTS OF THE INVENTION

According to an embodiment, a fuel cell is proposed which comprises a stack comprising an assembly of overlaid electrochemical generators, along a stack axis, and end plates axially clasping said assembly.

The fuel cell further comprises at least one holding winding, comprising at least one sheet, of at least one taut wire wound around the stack in the form of a plurality of turns, this holding winding surrounding said stack and bearing on said end plates, the ends of the taut wire being fixed on at least one of the end plates.

Said holding winding can comprise portions bearing on bearing portions of said end plates.

Said holding winding can comprise rounded portions bearing on spaced-apart bearing rounded portions of said end plates and free portions joining these bearing portions.

Said rounded portions and said free portions of said holding winding can advantageously join tangentially.

Said holding winding can extend into grooves of said end plates.

Said holding winding can be embedded in said grooves of said end plates.

The ends of the wire forming said winding can be glued or held by wedging on said end plates.

Said plates can have projecting tabs extending laterally with respect to said assembly and into which said grooves extend.

The fuel cell can comprise several parallel holding windings, spaced perpendicularly with respect to the stack axis.

Advantageously, the wire of said holding winding can be made of glass fibres impregnated with a thermoset resin (CVR).

BRIEF DESCRIPTION OF THE DRAWINGS

A fuel cell will now be described by way of non-limiting example, illustrated by the drawing in which:

FIG. 5 shows an apparatus for producing a holding winding for the fuel cell of FIG. 1.

DETAILED DESCRIPTION OF EMBODIMENTS OF THE INVENTION

Figure 1:
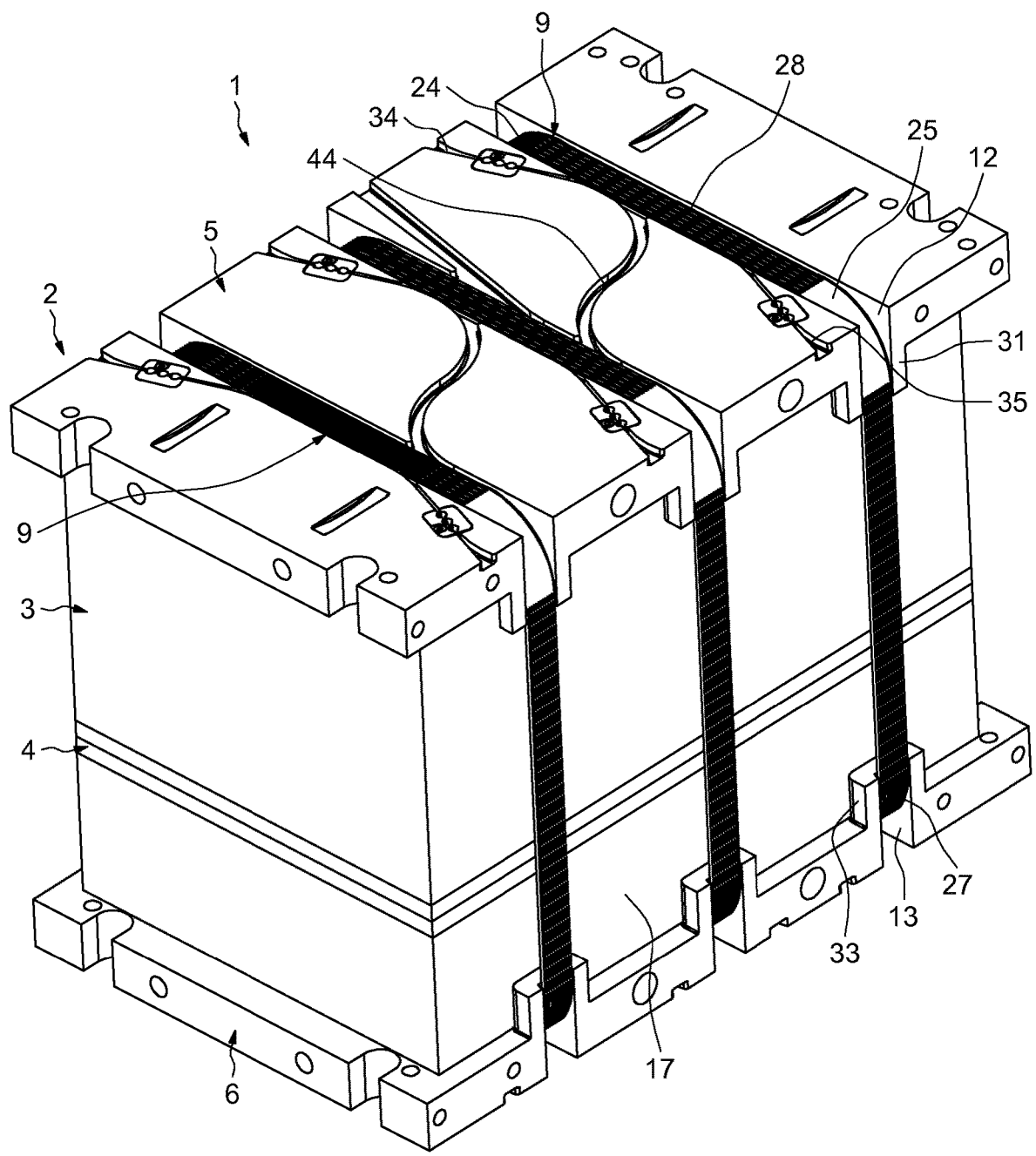
FIG. 1 shows a perspective view of a fuel cell, including an assembly of electrochemical generators, end plates and holding windings.

As illustrated in FIG. 1, a fuel cell 1 comprises a stack 2 which is made up of an assembly 3 of overlaid electrochemical generators 4, along a stack axis, and of end plates 5 and 6 axially clasping the assembly 3.

Figure 2:
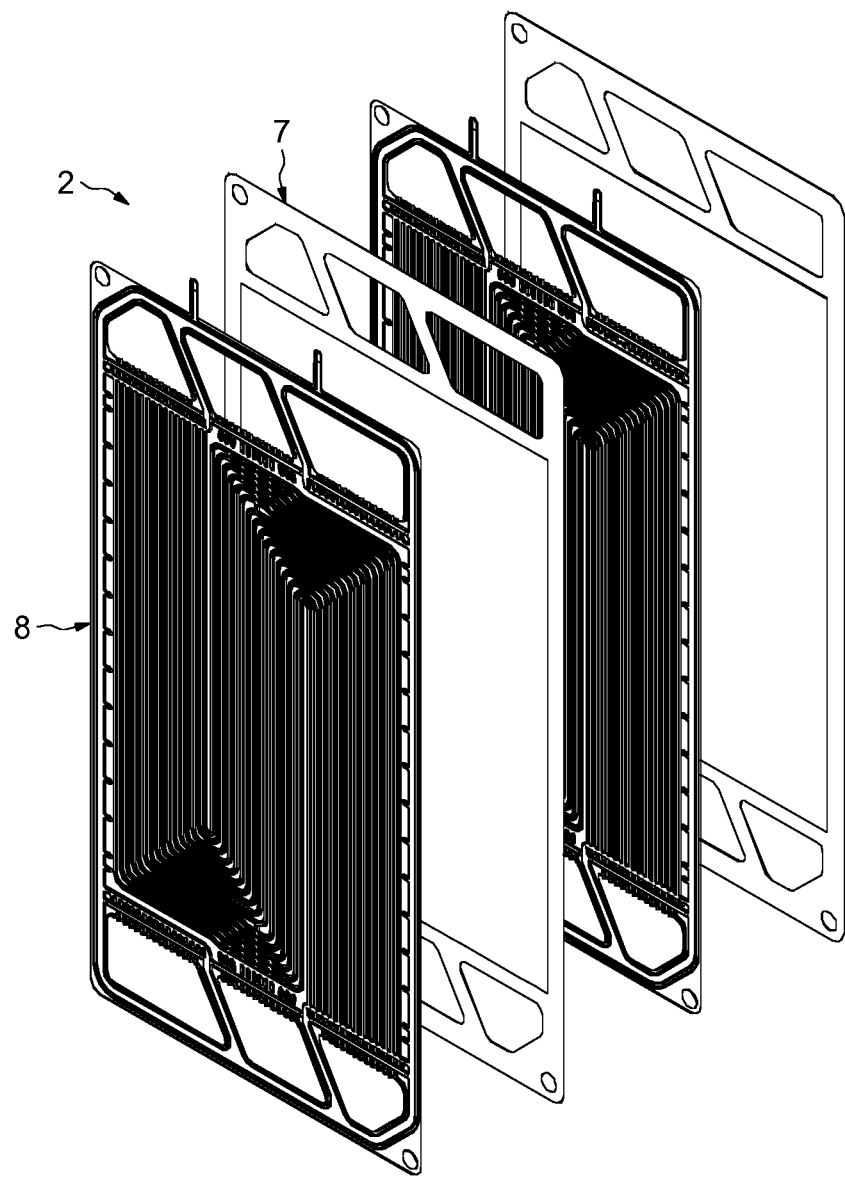
FIG. 2 shows a perspective exploded view of part of the assembly of electrochemical generators of FIG. 1.

As illustrated more precisely in FIG. 2, by way of example, the assembly 3 comprises a plurality of unit cells 7 in the form of plates, separated by bipolar plates 8. Each unit cell 7 comprises three overlaid layers, namely an anode, an electrolyte and a cathode. Each bipolar plate 8 supplies, on one side, fuel to the unit cell adjacent to this side and supplies, on the other side, oxidizer to the unit cell adjacent to this other side. The assembly 3 comprises channels laid out so as to provide these supplying operations via at least one of the end plates 5 and 6. The members external to the stack 2 of the fuel cell 1, for hydraulic connection and for electrical connection, are not shown in the drawing.

The assembly 3 is in the form of a parallelepiped. The end plates 5 and 6, which are thick and rigid, project laterally with respect to the assembly 3.

Figure 3:
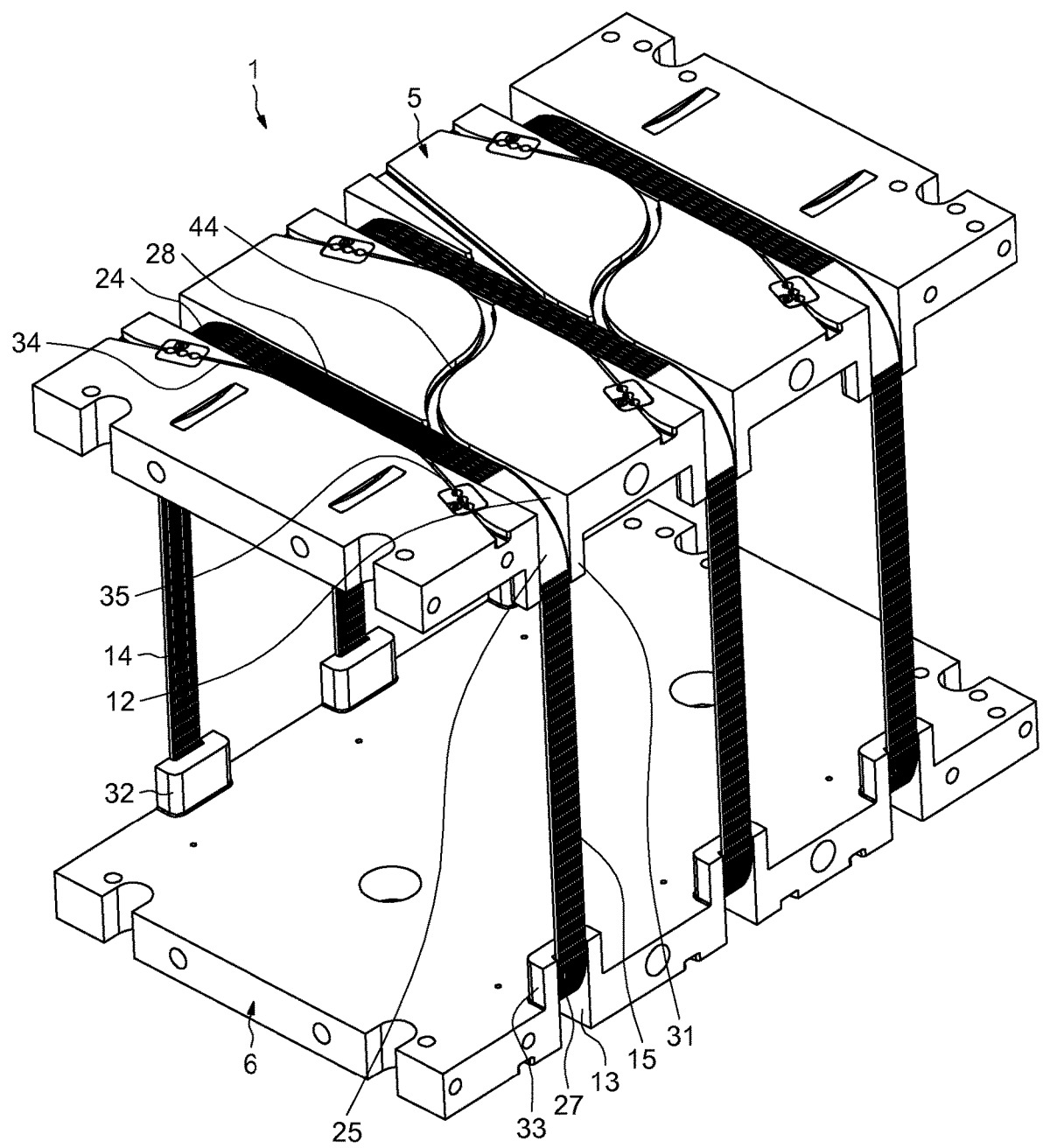
FIG. 3 shows a perspective view of part of the fuel cell of FIG. 1, the assembly of electrochemical generators being removed.
Figure 4:
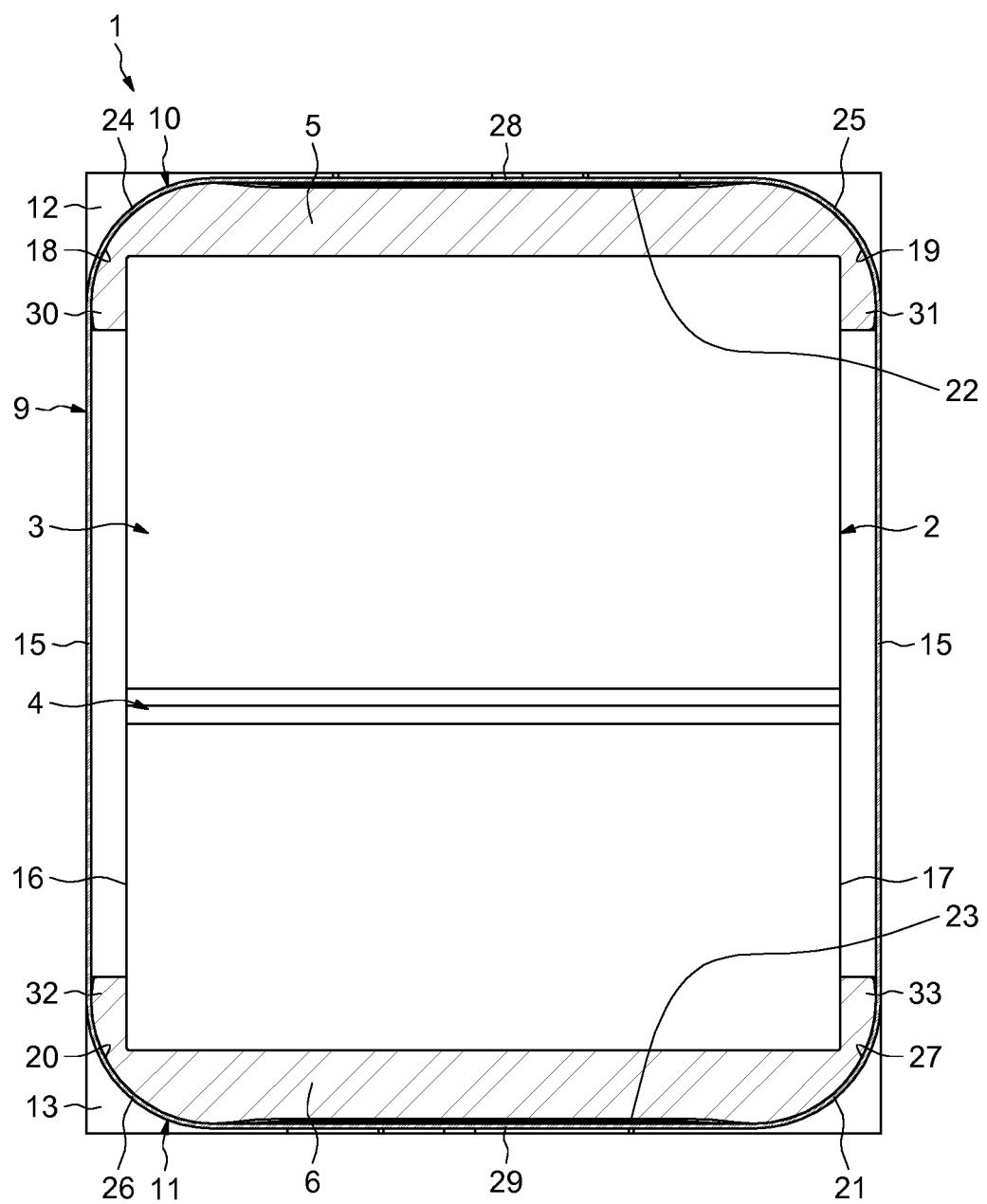
FIG. 4 shows a section along a stack axis of the fuel cell of FIG. 1, passing through a holding winding.

As illustrated in FIGS. 1, 3 and 4, the fuel cell 1 comprises windings 9 of a plurality of turns, having one or more overlaid sheets, of at least one taut wire wound around the stack 2, the windings 9 surrounding the stack 2 and bearing on the end plates 5 and 6. These windings 9 are used to firmly hold the plates of the assembly 3 and end plates 5 and 6 such as to bear on one another in order to provide the desired airtightness and the desired electrical contacts. In the example shown, three windings 9 are provided and are formed in a parallel manner at a distance from one another, perpendicular to the axis of the stack 2.

Each holding winding 9 has opposite portions 10 and 11 which are embedded in grooves 12 and 13 arranged in the outer faces of the end plates 5 and 6 and has intermediate opposite lateral portions 14 and 15, which are bearing-free, which join these embedded portions 10 and 11 and which extend along the stack axis, parallel to opposite flanks 16 and 17 of the assembly 3 and at a distance from these flanks.

The bottoms of the grooves 12 and 13 have end portions 18, 19 and 20, 21, respectively, which are rounded, in the form of quadrants, and spaced apart with respect to the axis of the stack, and deeper central portions 22 and 23.

Each holding winding 9 has corner rounded portions 24, 25 and 26, 27 bearing on the rounded end portions 18, 19 and 20, 21, respectively, of the corresponding grooves 12 and 13. The rounded end portions 18, 19 and 20, 21 are linked by opposite intermediate portions 28 and 29, which are bearing-free, extending above the central portions of the grooves 12 and 13, and link to the opposite lateral portions 14 and 15, which are bearing-free.

Thus, each holding winding 9 is in the form of a rectangular annular strip with rounded corners, the opposite intermediate portions 14 and 15 of which, which are bearing-free, and the opposite intermediate portions 28 and 29 of which tangentially join the corner rounded portions 24, 25 and 26, 27 bearing on the bearing rounded portions 18, 19 and 20, 21 of the grooves 12 and 13.

For the bearing rounded portions 18, 19 and 20, 21 of the grooves 12 and 13 to be able to have sufficient radii, the end plates 5 and 6 have projecting opposite tabs 30, 31 and 32, 33 which extend laterally with respect to the flanks 16 and 17 of the assembly 3 and into which the rounded end portions 18, 19 and 20, 21 of the grooves 12 and 13 extend, these tabs also positioning the end plates 5 and 6 with respect to the assembly 3.

The end portions of the wire forming each holding winding 9 can be fixed on one of the end plates 5 and 6 or one can be fixed on the end plate 5 and the other on the end plate 6.

For example, the end portions of the wire forming each holding winding 9 extend into slanting auxiliary outer grooves 34 and 35 of the end plate 5, opening into the groove 12, and are fixed in these grooves by a suitable glue or by additional mechanical means for wedging.

Preferably, the wire forming each holding winding 9 is made of glass fibres impregnated with a thermoset resin, generally referred to by the abbreviation CVR. Such a material has the advantage of having tensile strength while exhibiting a certain elasticity, so that the windings 9 make it possible to obtain the bearing desired pressures in the stack 2 and to provide the desired airtightness and the desired electrical contacts, which have been mentioned above, while being suitable for absorbing and compensating for the variations in dimensions of the stack 2, due in particular to the variations in temperature and humidity.

The corner rounded portions 24, 25 and 26, 27 of each winding 9 have radii such that the wire of the winding is subjected to limited bending stresses.

As illustrated in FIG. 5, each holding winding 9 can be produced like a reel.

Having formed the stack 2 and holding the latter temporarily, for example, by means of clamps, the stack 2 is fitted on a rotating machine 36, capable of rotating the stack 2 according to a mid-axis of rotation 37 perpendicular to the stack axis.

The end of a wire 38 is fixed in one of the auxiliary grooves 34 or 35, this wire coming from a supply reel 39.

The stack 2 and the supply reel 39 are rotated so that the wire 38 winds around the stack 2, engaging the stack 2 in the grooves 12 and 13 of the end plates 5 and 6, the wire 38 being tensioned by a counterweight 40 suspended from a pulley 41 pulling, downwards, a portion of the wire 38 passing over deflection pulleys 42 and 43 so that this portion of the wire 38 forms a U.

After having produced one sheet or several overlaid sheets of the wire 38 around the stack 2, the wire 38 is engaged in the other auxiliary groove 34 or 35. The wire 38 is glued in this auxiliary groove and the wire 38 is cut beyond this gluing.

The same operation is carried out to produce the other holding windings 9.

In an alternative embodiment, the holding windings 9 can be produced one after the other, the end plate 5 having connecting grooves 44 making it possible to pass the wire 38 from a produced winding to the neighboring winding to be produced.

The invention claimed is:

1. A fuel cell comprising:
   a stack that includes: (a) an assembly of overlaid electrochemical generators, stacked along a stack axis, and (b) end plates axially clasping the assembly of overlaid electrochemical generators, each end plate having an inner face oriented axially towards the assembly of overlaid electrochemical generators; and
   at least one holding winding,
   wherein:
   (1) each holding winding includes at least one annular sheet formed by at least one taut wire wound circumferentially around the stack and the end plates in a plurality of turns,
   (2) the axis of each holding winding is perpendicular to the stack axis,
   (3) each holding winding surrounds the stack and bears on outer faces of the end plates to hold the stack and the end plates so as to bear on one another, the outer face of each end plate being axially opposed to the inner face with regard to the stack axis,
   (4) each taut wire has ends that are fixed on at least one of the end plates,
   (5) each holding winding comprises lateral portions extending along the stack axis and parallel to opposite flanks of the assembly of overlaid electrochemical generators,
   (6) the lateral portions of each holding winding are positioned at a distance from the opposite flanks of the assembly of overlaid electrochemical generators,
   (7) the end plates include at least one pair of grooves, and
   (8) each holding winding extends into a corresponding one of the at least one pair of grooves around the stack.

2. The fuel cell according to claim 1, wherein each holding winding includes bearing portions that bear on bearing portions of the end plates.

3. The fuel cell according to claim 1, wherein each holding winding includes:
   rounded bearing portions, which bear on spaced-apart rounded bearing portions of the end plates, and
   free portions joining the rounded bearing portions.

4. The fuel cell according to claim 2, wherein the bearing portions of each holding winding are rounded bearing portions,
   wherein the bearing portions of the end plates are rounded bearing portions that are spaced apart on the end plates, and
   wherein the fuel cell further comprises free portions joining the rounded bearing portions of each holding winding.

5. The fuel cell according to claim 3, wherein the rounded bearing portions and the free portions of each holding winding are joined tangentially.

6. The fuel cell according to claim 4, wherein the rounded bearing portions and the free portions of each holding winding are joined tangentially.

7. The fuel cell according to claim 1, wherein each holding winding is embedded in a corresponding one of the at least one pair of grooves.

8. The fuel cell according to claim 1, wherein the ends of each taut wire are fixed on at least one of the end plates by glue or by a wedge.

9. The fuel cell according to claim 2, wherein the ends of each taut wire are fixed on at least one of the end plates by glue or by a wedge.

10. The fuel cell according to claim 1, wherein:
   the end plates include projecting tabs that extend laterally with respect to the assembly, and
   the end plates include grooves that extend into the projecting tabs.

11. The fuel cell according to claim 2, wherein:
   the end plates include projecting tabs that extend laterally with respect to the assembly, and
   the end plates include grooves that extend into the projecting tabs.

12. The fuel cell according to claim 1, wherein the at least one holding winding is a plurality of holding windings spaced perpendicularly with respect to the stack axis.

13. The fuel cell according to claim 2, wherein the at least one holding winding is a plurality of holding windings spaced perpendicularly with respect to the stack axis.

14. The fuel cell according to claim 1, wherein each taut wire is made of glass fibers impregnated with a thermoset resin.

15. The fuel cell according to claim 2, wherein each taut wire is made of glass fibers impregnated with a thermoset resin.

* * * * *